(12) United States Patent
Warizaya

(10) Patent No.: US 7,565,267 B2
(45) Date of Patent: Jul. 21, 2009

(54) LIFE PREDICTION AND MONITORING OF COMPONENTS

(75) Inventor: Kanji Warizaya, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 11/616,715

(22) Filed: Dec. 27, 2006

(65) Prior Publication Data

US 2007/0150236 A1    Jun. 28, 2007

(30) Foreign Application Priority Data

Dec. 28, 2005  (JP)  ............................. 2005-377548
Nov. 22, 2006  (JP)  ............................. 2006-316306

(51) Int. Cl.
*G06F 11/00* (2006.01)
*G21C 17/00* (2006.01)

(52) U.S. Cl. ........................... 702/182; 702/34; 702/57; 702/184; 340/635; 340/679; 361/23; 361/31

(58) Field of Classification Search ............... 702/34, 702/35, 57–59, 177, 182, 184; 340/635, 340/648, 679; 318/538; 361/23, 30, 31; 701/30

See application file for complete search history.

(56) References Cited

U.S. PATENT DOCUMENTS 5,251,144 A * 10/1993 Ramamurthi ............... 700/177

6,199,018 B1 * 3/2001 Quist et al. ................... 702/34
6,434,512 B1 * 8/2002 Discenzo ..................... 702/184
7,142,125 B2 * 11/2006 Larson et al. ................ 340/635
7,222,048 B2 * 5/2007 Petchenev et al. ........... 702/182

FOREIGN PATENT DOCUMENTS

JP          62-157988           7/1987

(Continued)

OTHER PUBLICATIONS

Hogan, 'The Effect of Fan-Reliability and Cooling-Performance on Electronic-Chassis Reliability', Mar. 1993, IEEE Publication, vol. 42, No. 1, pp. 172-174.*

(Continued)

*Primary Examiner*—Edward Raymond
*Assistant Examiner*—Elias Desta
(74) *Attorney, Agent, or Firm*—Ostrolenk, Faber, LLP

(57) ABSTRACT

A counting unit counts a current supplying duration for a component which determines a life of a device. A prediction unit predicts the device life based on an integrated current supplying duration integrated by the counting unit and a lifetime of the component. A monitoring unit monitors an efficient operating condition of the device based on a prediction signal outputted from the life prediction unit. The counting unit and the life prediction unit is provided at a short-life fan and a long-life component respectively, and the life prediction unit predicts the life of the device based on information on the short-life fan and the long-life component.

9 Claims, 5 Drawing Sheets

FOREIGN PATENT DOCUMENTS

| | | |
|---|---|---|
| JP | 05-184191 | 7/1993 |
| JP | 05-205460 | 8/1993 |
| JP | 05-090155 | 12/1993 |
| JP | 06-027175 | 2/1994 |
| JP | 06-070553 | 3/1994 |
| JP | 06-233553 | 8/1994 |
| JP | 06-080386 | 11/1994 |
| JP | 11-356036 | 12/1999 |
| JP | 2002-157813 | 5/2002 |
| JP | 2003-068008 | 3/2003 |
| JP | 2005-221413 | 8/2005 |

OTHER PUBLICATIONS

Kannatey-Asibu, Jr., 'New Concepts on Multi-Senosr Monitoring for Reconfigurable Machining Systems', 1992, UOM Publicaiton, pp. 1-13.*

Office Action from the Japanese Patent Office in connection with the corresponding Japanese Patent Application No. 2006-316306, mailed Jan. 27, 2009.

Certified partial English translation of an Office Action from the Japanese Patent Office in connection with the corresponding Japanese Patent Application No. 2006-316306, mailed Jan. 27, 2009.

* cited by examiner

LIFE PREDICTION AND MONITORING OF COMPONENTS

FIELD OF THE INVENTION

The present invention relates to a life prediction and monitoring apparatus for predicting a life of a component which determines a life of an electrical equipment or an electronic device (hereinafter, called a device), and monitoring an efficient operating condition of the device.

DESCRIPTION OF THE RELATED ART

A life prediction and monitoring apparatus has been developed for predicting lives of components, which determine lives of devices, so as to monitor efficient operating conditions of the devices. Here, the efficient operating condition of a device means that a substantial operating period remains for the device to work within its residual life. As shown in FIG. 5, a conventional life prediction and monitoring apparatus (in the Japanese Patent Laid Open 11-356036, Patent document 1, for example) 80 comprises a parameter setting circuit 82, a life prediction circuit 83, a nonconformity output circuit 84, a life detection circuit 85, a voltage detection circuit 86, a temperature detection circuit 87, a notification output circuit 88 and a life indication circuit 89. The parameter setting circuit 82, the life prediction circuit 83, the nonconformity output circuit 84, and the life detection circuit 85 configure a microcomputer 81.

A direct current stabilizing power supply 90 having the life prediction and monitoring apparatus 80 comprises a main power supply 91 and a capacitor 92. The main power supply 91 commutates an inputted alternating current voltage and outputs direct current. The capacitor 92 is connected to an output side of the main power supply 91 and smoothes a voltage outputted from the main power supply 91.

The life prediction and monitoring apparatus 80 monitors an efficient operating condition of the direct current stabilizing power supply 90 by predicting a life of the capacitor 92 inside the direct current stabilizing power supply 90. The voltage detection circuit 86 of the life prediction and monitoring apparatus 80 measures a voltage between both terminals of the capacitor 92 and outputs a measured voltage value to the life detection circuit 85. The temperature detection circuit 87 measures temperature of the capacitor 92 with a temperature sensor 87a and outputs the measured temperature to the life detection circuit 85. The parameter setting circuit 82 sets data at each target to be monitored its life, as a monitoring reference, and stores the data. The life detection circuit 85 reads out the setting data from the parameter setting circuit 82, compares the setting data with the measured results by the voltage detection circuit 86 and the temperature detection circuit 87, and detects a condition of the capacitor 92. An output signal of the life detection circuit 85 is inputted into the notification output circuit 88 and the life prediction circuit 83. Then, if the life prediction circuit 83 determines that it is in its end-of-life, the result is outputted into the nonconformity output circuit 84 and life indication circuit 89.

Moreover, the Japanese Patent Laid Open 05-205460, Patent document 2, discloses a technology in which an optical disc medium is prevented from declining in read/write function due to an increased temperature in an optical disc device by controlling a fan rotation number not to be or exceed a certain level.

The life prediction and monitoring apparatus disclosed in the Patent document 1 determines an efficient operating condition of the device by predicting a life of the capacitor which has the longest life in the direct current stabilizing power supply.

Meanwhile, there are other components than the capacitor in the direct current stabilizing power supply, such as wear components like a fan, and power conversion components like a transformer, which are also main components to determine the life of the direct current stabilizing power supply.

Therefore, there is a problem in the life prediction for the direct current stabilizing power supply that measuring only for capacitor, as in Patent document 1, cannot predict the life of the direct current stabilizing power supply accurately.

Moreover, in Patent document 2, temperature in the optical disc device is managed to be maintained at a threshold with a fan, however, the optical disc device is monitored without a life prediction for the fan, so that a failure prediction cannot be performed stably. In addition, in Patent document 2, a failure of the optical disc device is prevented by single fan only, not prevented by plurality of components.

As described above, the conventional life prediction and monitoring apparatuses monitor an efficient operating condition of a power supply with a life of a single capacitor or fan thereof. Therefore, a life prediction is unclear, and a failure prediction of the power supply is unstable, that causes declining in reliability of measures to perform preventative replacement for components by detecting a failure occurrence of a power supply in advance.

SUMMARY OF THE INVENTION

The object of the present invention is to provide a life prediction and monitoring apparatus which increase reliability of preventative replacement for components by detecting a failure occurrence of a power supply in advance.

In order to achieve the above object, a life prediction and monitoring apparatus, according to the present invention, which predicts a life of a component to determine a device life so as to monitor an efficient operating condition of the device comprises:

a counting unit for counting a current supplying duration for a component and integrating the same;

a life prediction unit for predicting the life of component based on the integrated current supplying duration integrated by the counting unit and the lifetime of the component; and a monitoring unit for monitoring an efficient operating condition of the device based on a prediction signal outputted from the life prediction unit;

wherein the counting unit and the life prediction unit are provided at a short-life fan and a long-life component respectively.

The present invention is not limited to the case in which life prediction and monitoring is established as hardware. In the case in which that is established as a method, a life prediction and monitoring method, according to the present invention, for predicting a life of a component to determine a device life so as to monitor an efficient operating condition comprises:

a counting step of counting a current supplying duration for the component and integrating the same; and a life prediction step of predicting a component life based on the integrated current supplying duration and the lifetime of the component;

wherein the counting step and the life prediction step are performed for a short-life fan and a long-life component respectively, and an efficient operating condition of the device is monitored based on a prediction signal predicted in the life prediction step.

Further, in the case in which that is established as a program, a life prediction and monitoring program, according to the present invention, causes a computer configuring a life prediction and monitoring apparatus which predicts a life of a component to determine a device life so as to monitor an efficient operating condition of the device to execute the functions of:

counting a current supplying duration for the component and integrating the same; and predicting the life of the component based on the integrated current supplying duration and a lifetime of the component; with respect to a short-life fan and a long-life component, and the program causes the computer to execute further a function of:

monitoring an efficient operating condition of the device based on a prediction signal predicted at the life prediction step.

According to the present invention, processings for counting a current supplying duration, predicting a life of the device based on the counted current supplying duration and a lifetime, and monitoring an efficient operating condition of the device based on the life prediction signal are performed at each fan and component with different lifetime, so that reliability of measures to perform preventative replacement for a component by detecting a failure occurrence of the power supply in advance.

DETAILED DESCRIPTION OF THE EMBODIMENTS

Hereinafter, an embodiment of the present invention will be explained with reference to the accompanying drawings.

Figure 1:
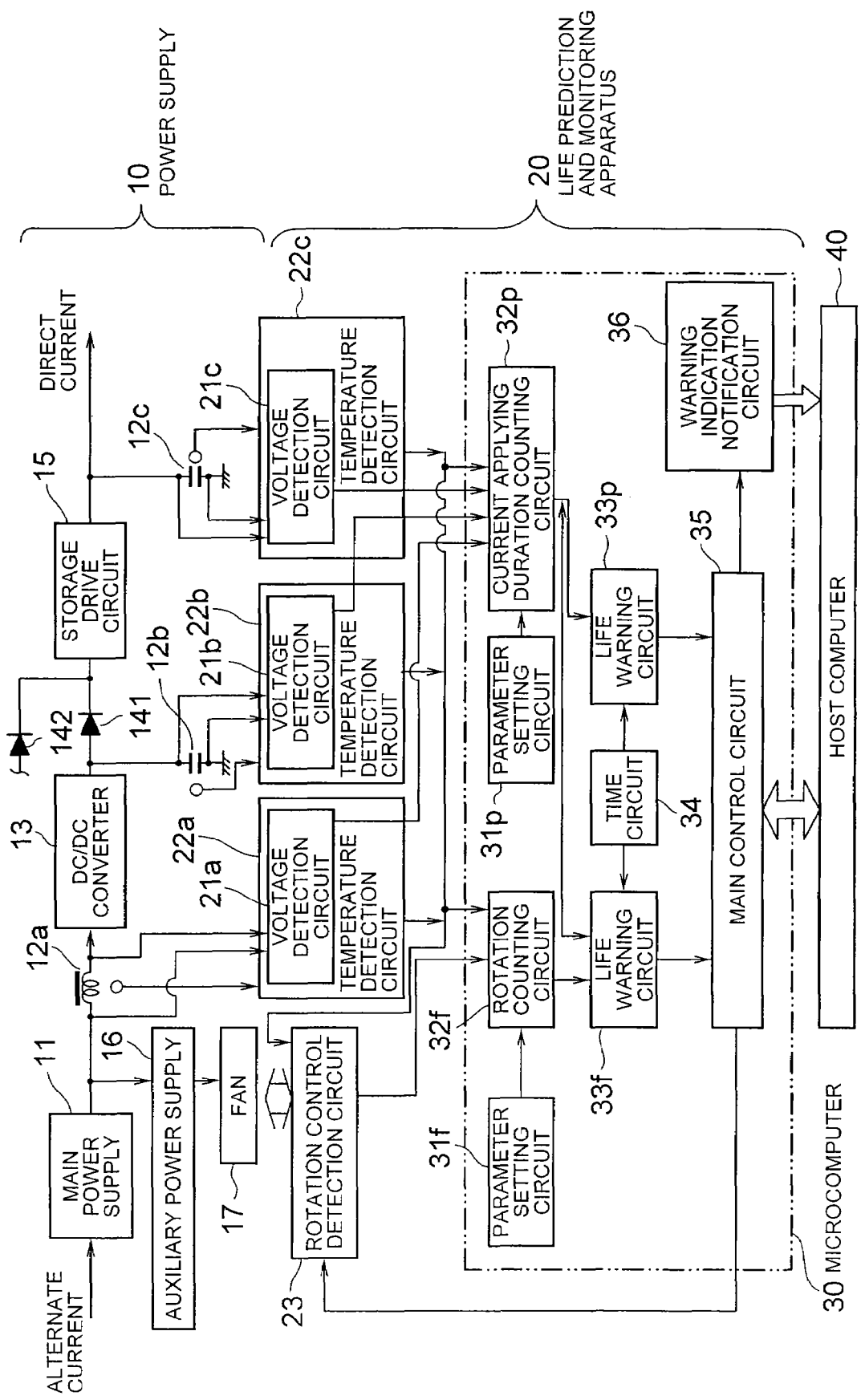
FIG. 1 is a block diagram showing a life prediction and monitoring apparatus according to an embodiment of the present invention.

FIG. 1 shows a power supply 10 comprising a life prediction and monitoring apparatus 20 according to the present embodiment. The power supply 10 shown in FIG. 1 is used as a power supply for a storage device shown in FIG. 4, while a target device for monitoring is not limited to this case. The life prediction and monitoring apparatus 20 shown in FIG. 1 may be used for failure prediction for other devices than the storage device. In the following, a case is explained with an example where the life prediction and monitoring apparatus 20 is applied to the power supply 10 of the storage device according to the present embodiment.

The power supply 10 included in the storage device comprises a main power supply 11, a coil 12a, capacitors 12b and 12c, a DC/DC converter 13, adverse current preventive diodes 141 and 142, a storage drive circuit 15, an auxiliary power supply 16, and a fan 17.

Figure 4:
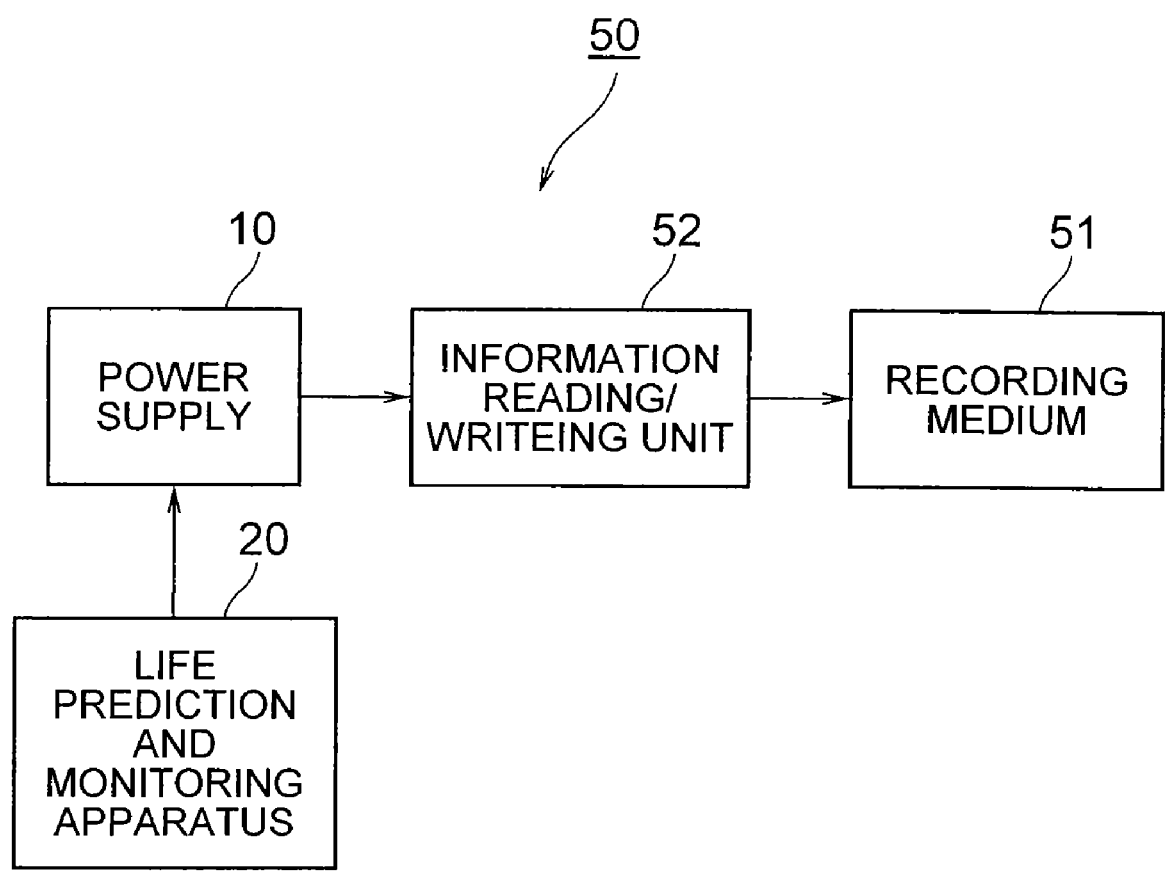
FIG. 4 is a block diagram showing a case in which the life prediction and monitoring apparatus according to the embodiment of the present invention is applied to a storage device.
Figure 5:
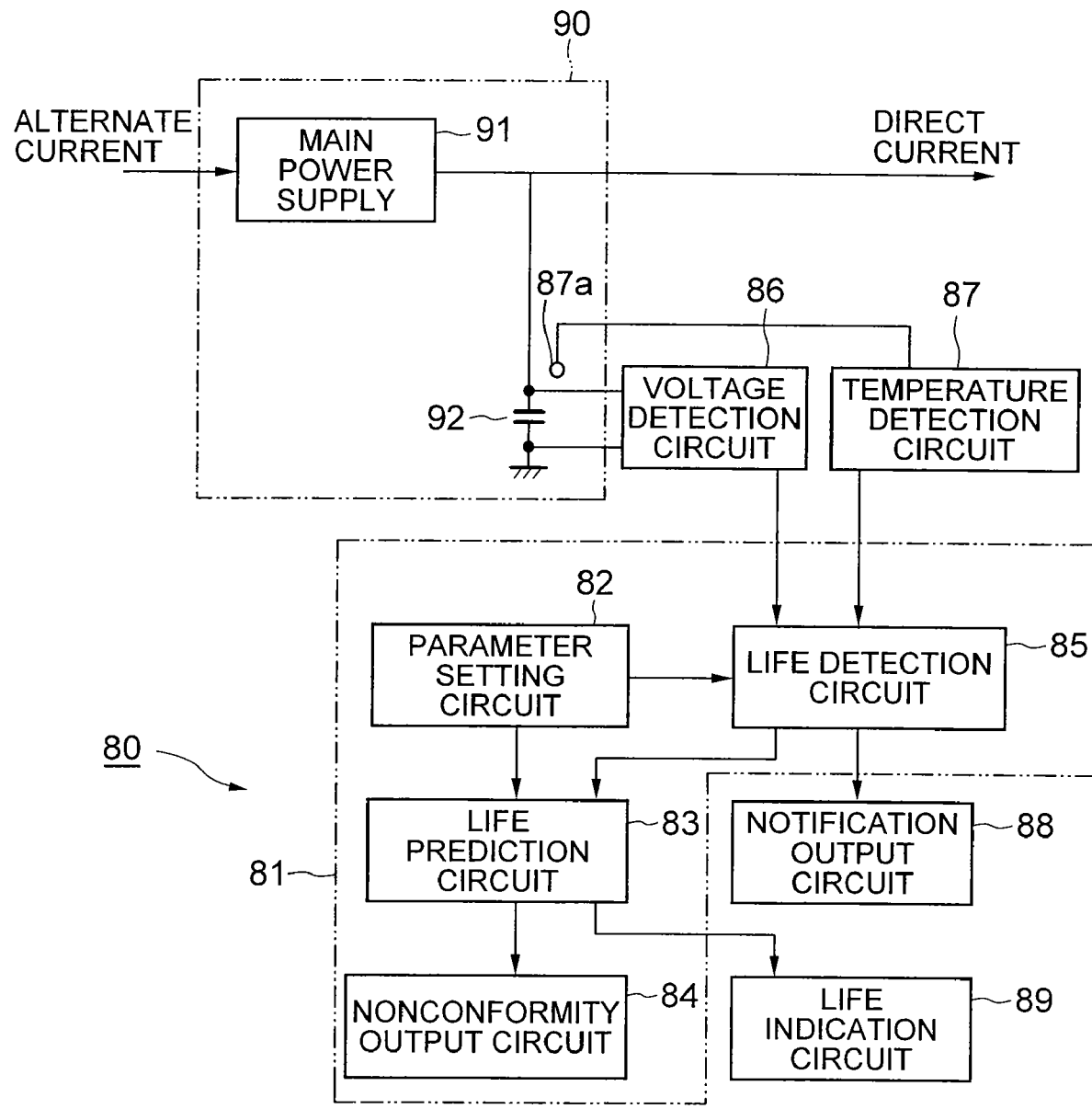
FIG. 5 is a block diagram showing a conventional life prediction and monitoring apparatus.

The main power supply 11 converts commercial alternating current power into direct current power so as to output it into the DC/DC converter 13 through the coil 12a for stabilizing current. The DC/DC converter 13 converts the inputted direct voltage into a prescribed direct voltage and outputs it to the storage drive circuit 15. The storage drive circuit 15 provides direct current power to the storage device (FIG. 4). The DC/DC converter 13 and the storage drive circuit 15 are connected each other by the adverse current preventive diodes 141 and 142. The adverse current preventive diode 142 is a redundancy. Output sides of the DC/DC converter 13 and the storage drive circuit 15 are connected to the capacitors 12b and 12c respectively for stabilizing a voltage. An output side of the main power supply 11 is connected to the auxiliary power supply 16 and electric power is outputted from the auxiliary power supply 16 into the fan 17. The fan 17 cools each component in the power supply 10.

The life prediction and monitoring apparatus 20 according to the embodiment uses the fan 17 as well as the coil 12a and the capacitors 12b, 12c of the power supply 10, for determining a life of the power supply 10.

Here, the coil 12a and the capacitor 12b, 12c of the power supply 10 are long-life components having strong resistance to voltage and temperature. On the other hand, the fan 17 is a shorter-life component than the coil 12a and the capacitor 12b, 12c because the fan 17 has a movable part in which failure easily occurs due to its wear. The power supply 10 mounts the fan 17 with a short life as well as the coil 12a and the capacitors 12b, 12c with long lives. If that is not considered on determining the life of the power supply 10, an efficient operating condition of the power supply 10 until its end-of-life cannot be predicted accurately.

In the embodiment, lives of components 12a, 12b, 12c and 17 which are to determine the life of the power supply 10 and which have different life-spans from each other are predicted so that the efficient operating condition of the power supply 10 is monitored accurately. In the above, the coil 12a and the capacitors 12b, 12c are used as long-life components to determine the life of the power supply 10, however, the case is not limited to this. For example, an unillustrated transformer inside of the main power supply 11 or the diode 141 may be used instead of the coil 12a and the capacitors 12b, 12c. Hereinafter, a case will be explained with an example in which the coil 12a and the capacitors 12b, 12c are used as long-life components.

As a fundamental configuration, the life prediction and monitoring apparatus 20 according to the embodiment is a life prediction and monitoring apparatus for predicting a life of a component to determine a device life so as to monitor an efficient operating condition of the device, and the apparatus comprises:

a counting unit for counting a current supplying duration for the component and integrating the same;

a life prediction unit for predicting the life of the component based on the integrated current supplying duration integrated by the counting unit and the lifetime of the component; and an monitoring unit for monitoring an efficient operating condition of the device based on a predicting signal outputted from the life prediction unit;

wherein the counting unit and the life prediction unit are provided at a fan with a short life and a component with a long life. The power supply 10 is used as the device in the present invention.

The coil 12a and the capacitors 12b, 12c to determine a life of the power supply 10 have voltage detection circuits 21a, 21b, 21c and temperature detection circuits 22a, 22b, 22c. Further, the fan 17 to determine a life of the power supply 10 has a rotation control detection circuit 23.

The voltage detection circuit 21a constantly detects a voltage of the coil 12a, the voltage detection circuit 21b constantly detects a voltage of the capacitor 12b, and the voltage detection circuit 21c constantly detects a voltage of the capacitor 12c. The temperature detection circuit 22a constantly detects a heating temperature of the coil 21a, the temperature detection circuit 22b constantly detects a heating temperature of the capacitor 12b, and the temperature detection circuit 22c constantly detects a heating temperature of the capacitor 12c. The rotation control detection circuit 23 makes the fan 17 rotate constantly, and the rotation speed is increased when temperature elevation is detected depending on inputted signals from the temperature detection circuits 22a, 22b and 22c. Further, the rotation control detection circuit 23 controls the rotation of the fan 17 based on a command from the outside and constantly detects the rotation number of the fan 17 at each rotating state. The outside command is sent from a main control circuit 35 which is described later.

A current supplying duration counting circuit 32p integrates and counts the current supplying duration for the coil 12a and the capacitors 12b, 12c based on detected signals outputted from the voltage detection circuits 21a, 21b, 21c and the temperature detection circuits 22a, 22b, 22c. A rotation time counting circuit 32f integrates and counts the current supplying durations for the fan 17 based on detected signals outputted from the rotation control detection circuit 23 and the temperature detection circuits 22a, 22b, 22c. The rotation time of the fan 17 corresponds to the current supplying duration for the fan 17, so that the rotation time counting circuit 32f integrates and counts the current supplying duration for the fan 17 based on the detected signal outputted from the rotation control detection circuit 23.

Here, the current supplying duration counting circuit 32p and the parameter setting circuit 31p configure the counting unit for integrating and counting the current supplying duration for the coil 12a and the capacitors 12b, 12c with long-life components. The rotation time counting circuit 32f and the parameter setting circuit 31f configure the counting unit for integrating and counting the current supplying duration for the fan 17 with a short-life component.

Further, the rotation time counting circuit 32f to which an output from the rotation control detection circuit 23 in the fan 17 is inputted adds a correction coefficient associated with increase of the rotation number of the fan 17 in the case where the temperature of the long-life components exceeds a threshold so as to correct the integrated current supplying duration and the lifetime. The current supplying duration counting circuit 32p in the long-life components (the coil 12a and the capacitors 12b, 12c) adds a correction coefficient associated with the temperature exceeding the threshold when the current supplying duration of the long-life components are measured so as to correct the integrated current supplying duration and the lifetime. Here, a recommended operating temperature of the long-life components is specified as the threshold.

Moreover, the rotation time counting circuit 32f to which an output from the rotation control detection circuit 23 in the fan 17 is inputted differentiates an equation indicating a life warning line (the equation (4)) shown as a current supplying duration function so as to calculate a deterioration rate of the fan 17 (the equation (6), (8)). The current supplying duration counting circuit 32p in the long-life components differentiates an equation indicating a life warning line (the equation (3)) shown as the current supplying duration function so as to calculate a deterioration rate of the long-life component (the equation (5), (7)).

Further, the life prediction and monitoring apparatus 20 comprises the life prediction unit for predicting a device life based on the integrated current supplying duration by the counting unit and the lifetime of the components (including the fan 17) and the monitoring unit for monitoring the efficient operating condition of the power supply (the device) 10 based on a predicting signal outputted from the life prediction unit. The prediction unit at the fan 17 is configured with a life warning circuit 33f and a time circuit 34. The prediction unit at the long-life components is configured with a life warning circuit 33p and a time circuit 34. The monitoring unit is configured with a main control circuit 35.

The monitoring unit inputs information about the calculated deterioration rates of the fan 17 and the long-life components (the coil 12a, 12, 12c), and reduces a rotation number so as to control the deterioration rate of the fan 17 to become close to the deterioration rate of the long-life components.

Figure 3:
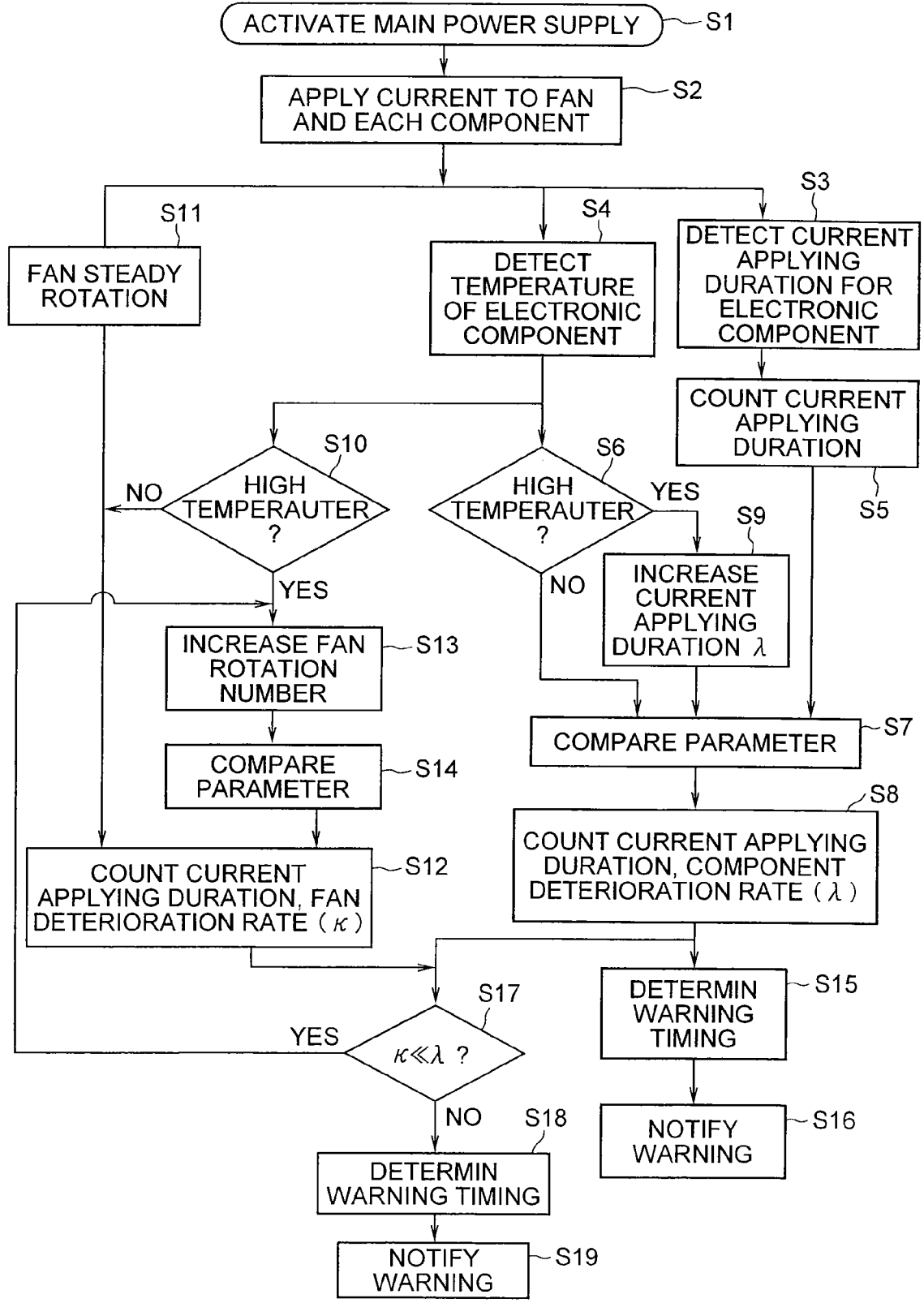
FIG. 3 is an operation flow diagram explaining an operation of the life prediction and monitoring apparatus shown in FIG. 1.

In the above explanation, the parameter setting circuit 31p, the current supplying duration counting circuit 32p, the parameter setting circuit 31f, the rotation time counting circuit 32f, the life warning circuit 33f, the life warning circuit 33p, the main control circuit 35, a warning indication circuit 36 are established as hardware, however, the case is not limited to this. It may be established as a software to cause executing the functions of the parameter setting circuit 31p, the current supplying duration counting circuit 32p, the parameter setting circuit 31f, the rotation time counting circuit 32f, the life warning circuit 33f, the life warning circuit 33p, the main control circuit 35, the warning indication circuit 36 described above, that is, a life prediction and monitoring program of which operation is shown in FIG. 3 is read out by CPU of the microcomputer 30 to cause the execution. The time circuit 34 is configured with a timer built into the microcomputer 30.

Figure 2:
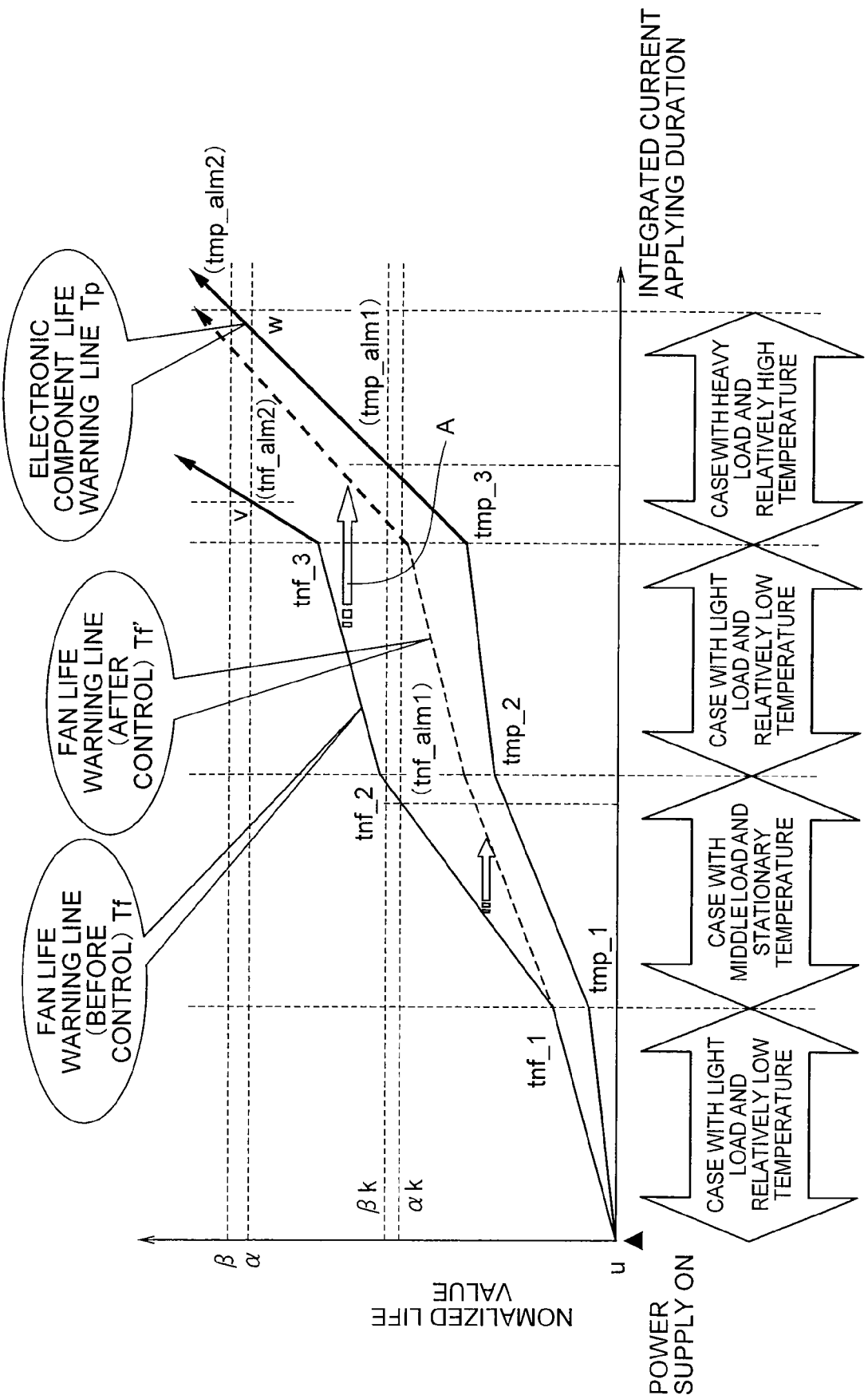
FIG. 2 is a characteristic chart showing a relationship between an integrated current supplying duration and a normalized lifetime value with respect to a fan and an electronic component which are monitoring targets for the life prediction and monitoring apparatus shown in FIG. 1.

Next, necessary equations in the cases in which (1) the life prediction unit executes a function of predicting a life of a component based on an integrated current supplying duration and a lifetime of the component;

(2) the rotation time counting circuit 32f executes a function of correcting the integrated current supplying duration and the lifetime by adding the correction coefficient associated with increase of the rotation number of the fan 17 in the case where temperature of the long-life component exceeds the threshold;

(3) The current supplying duration counting circuit 32p executes a function of correcting the integrated current supplying duration and the lifetime by adding a correction coefficient associated with the temperature exceeding the threshold when the current supplying duration is measured;

(4) the rotation time counting circuit 32f executes a function of calculating the deterioration rate of the fan 17 by differentiating an equation indicating the life warning line of the fan 17 shown as the current supplying duration function; and (5) the current supplying duration counting circuit 32p execute a function of calculating the deterioration rate of the long-life components by differentiating an equation indicating the life warning line of the components shown as the current supplying duration function;

will be explained with reference to FIG. 2. In FIG. 2, a horizontal axis shows an integrated current supplying duration for the components (including the fan 17), and a vertical axis shows a normalized life value respectively. The normalized life value shown on the vertical axis in FIG. 2 means an inverse of lives of the fan 17 and the components 12a, 12b, 12c.

The life $L_t$ of the power supply 10 is proportional to an inverse of a total deterioration rate $F_t$ of n fans 17 and m components (the coil 12a and the capacitors 12b, 12c) which configure the power supply 10, as shown in the equation (1):

$$L_t = \frac{1}{F_t} \quad (1)$$

The total deterioration rate $F_t$ is the sum of the normalized life index of each component $(Tf_i/a_i)$ and $(Tp_i/b_i)$:

$$F_t = \sum_{n=1}^{n} \frac{Tf_i}{a_i} + \sum_{m=1}^{m} \frac{Tp_i}{b_i} \quad (2)$$

Here, $$\sum_{n=1}^{n} \frac{Tf_i}{a_i}$$

shows the deterioration rate of n fans 17, and $$\sum_{m=1}^{m} \frac{Tp_i}{b_i}$$

shows the deterioration rate of m components (the coil 12a and the capacitor 12b, 12c).

The normalized life index $(Tf_i/a_i)$ and $(Tp_i/b_i)$ of each component (including the fan 17) can be shown by the integrated current supplying time $Tf_i$ and $Tp_i$ for each component with respect to the lifetimes $a_i$ and $b_i$ of each component, that is, $(Tf_i/a_i)$ and $(Tp_i/b_i)$. Therefore, the life of the power supply 10 can be predicted by measuring the integrated current supplying duration $Tf_i$ and $Tp_i$ for each component shown in the horizontal axis in FIG. 2. Here, the integrated duration $Tf_i$ indicates integrated durations for the fan 17, and the integrated duration $Tp_i$ indicates integrated duration for the coil 12a and the capacitors 12b, 12c respectively.

Accordingly, the current supplying duration counting circuit 32p outputs data to the life warning circuit 33p; the data is the lifetime $b_i$ of the long-life components 12a, 12b, 12c set in the parameter setting circuit 31p, and the integrated current supplying duration $Tp_i$ measured for the long-life components 12a, 12b, 12c respectively. The life warning circuit 33p predicts the life of the components 12a, 12b, 12c by the equations (1) and (2) based on the received lifetime $b_i$ of the long-life components 12a, 12b, 12c and the integrated current supplying duration $Tp_i$ measured for the long-life components 12a, 12b, 12c.

The rotation time counting circuit 32f outputs the lifetime $a_i$ of the short-life component 17 set in the parameter setting circuit 31f and the integrated current supplying durations $Tf_i$ measured for the short-life component 17 to the life warning circuit 33f. The life warning circuit 33f predicts the life of the component 17 with the equations (1) and (2) based on the received lifetime $a_i$ of the short-life component 17 and the integrated current supplying duration $Tf_i$ measured for the short-life component 17.

As shown in FIG. 2, after the power supply 10 is activated, in the case with a light load and relatively low temperature, a components life warning line Tp for the components 12a, 12b, 12c has a relatively modest pitch in the integrated current supplying durations of 0-tmp_1 and tmp_2-tmp_3. On the other hand, a fan life warning line Tf for the fan 17 is steeper than the electronic component life warning line Tp in the integrated current supplying durations of 0-tnf_1, tnf_2-tnf_3. Further, in the case with a middle load and stationary temperature, the electronic components life warning line Tp and the fan life warning line Tf is steeper than those in the case with the light load and the relatively low temperature in the integrated current supplying durations (tmp_1-tmp_2, tnf_1-tnf_2). Furthermore, in the case with a heavy load and a relatively high temperature, the electronic components life warning line Tp and the fan life warning line Tf become steep more and more than those in the case with the light load and a relatively low temperature in the integrated current supplying durations (tnf_3-tnf_alm2, tmp_3-tmp_alm2).

As shown in FIG. 2, the electronic components life warning line Tp and the fan life warning line Tf varies continuously toward the electronic component integrated life warning value β and the fan integrated life value α, which are the largest values corresponding to the integrated current supplying duration respectively, based on changes of a load and a temperature. In FIG. 2, βk and αk is set in smaller values (k<1) than the electronic component integrated life warning value β and the fan integrated life value α. βk is set to indicate a guideline of an efficient operating condition until the end-of-line before the efficient operating condition of the components (12a, 12b, 12c) reaches the electronic component integrated life warning value β. αk is set to indicate a guideline of an efficient operating condition until the end-of-life before the efficient operating condition of the fan 17 reaches the fan integrated life warning value α. The integrated duration to the intersecting point of the electronic component life warning line Tp and the fan life warning line Tf, and, the preceding electronic component integrated life warning value βk and the preceding fan integrated life value αk is tmp_alm1 for the components (12a, 12b, 12c), and tnf_alm1 for the fan 17. Further, the integrated duration to the intersecting point of the electronic component life warning line Tp and the fan life warning line Tf, and, the electronic component integrated life warning value β and the fan integrated life value α is tmp_alm2 for the components (12a, 12b, 12c), and tnf_alm2 for the fan 17. Therefore, when the integrated duration for the components (12a, 12b, 12c) reaches tmp_alm2, the components (12a, 12b, 12c) reaches the end of these lives, then the efficient operating condition of the power supply (the device) 10 becomes zero. When the integrated durations for the fan 17 reaches tnf_alm2, the fan 17 reaches the end of its life, then the efficient operating condition of the power supply (the device) 10 becomes zero.

The life warning line Tp and Tf of each component (including the fan 17) having the electronic component life warning value β and the fan life warning value α, which are final values of the normalized life value, are sums of the current supplying duration functions (x) and (y) of each component (including the fan 17). Each component is under the influence of the temperature at the measuring point, so that the current supplying duration counting circuit 32$p$ and the rotation time counting circuit 32$f$ calculate based on the equations (3) and (4) adding the correction coefficient by the temperature at each point of measuring temperature for the components 12$a$, 12$b$ and 12$c$.

The life warning line Tp for the components 12$a$, 12$b$ and 12$c$ is the equation (3), and the life warning line Tf for the fan 17 is the equation (4).

$$\frac{Tp(x)}{a} = k \int f(x)dx \quad (3)$$

$$\frac{Tf(y)}{a} = \lambda \int f(y)dx \quad (4)$$

Here, k and λ indicate deterioration coefficients (correction coefficients) including a temperature coefficient.

In the equations (3) and (4), the function f(x) is sequential from a power activation time u to the fan integrated life warning value α in FIG. 2. By the same token, the function f(y) is sequential from a power activation time u to the component integrated life warning value β in FIG. 2.

Therefore, there are deterioration rates of each component (including the fan 17) shown in the equations (5) and (6) at each current supplying duration t. The equation (5) indicates the deterioration rate of the components (12$a$, 12$b$, 12$c$) and the equation (6) indicates the deterioration rate of the fan 17 respectively.

$$\frac{d}{dx}\int f(t)dt \quad (5)$$

$$\frac{d}{dy}\int f(t)dt \quad (6)$$

When the deterioration rate of each component indicated by the equations (5) and (6) are integrated, the deterioration rate of the fan 17 is shown in the equation (7), and the deterioration rate of the long-life component is shown in the equation (8).

$$k\int f(t)dt \quad (7)$$

$$\lambda \int f(t)dt \quad (8)$$

The total deterioration rate Ft indicating the life Lt of the power supply 10 can be counted by summing of the equations (7) and (8).

Accordingly, when the deterioration rate is calculated by adding the correction coefficient, the life warning circuit 33$p$ predicts the life of the components 12$a$, 12$b$ and 12$c$ with the equations (1) and (7). In the same manner, the life warning circuit 33$f$ predicts the life of the components 17 with the equations (1) and (8).

The rotation time counting circuit 32$f$ calculates the deterioration rate (the equation (8)) of the fan 17 by differentiating the equation (4) which indicates the life warning line of the fan 17 shown as the current supplying duration function. The current supplying duration counting circuit 32$p$ calculates the deterioration rate of the long-life components (the equation (7)) by differentiating the equation (3) which indicates the life warning line of the components shown as the current supplying duration function.

Here, even if take into account the fact that the capacitors 12$b$ and 12$c$ live shorten by half due to increase of the temperature by 10° C., the current supplying duration Tfi for the fan 17 with respect to the life is significantly shorter than the current supplying duration Tpi for the long-life components because of its characteristic. That is, the relationship is shown as the current supplying duration Tfi<<the current supplying duration Tpi. The life of the fan 17 is determined by the rotation number mainly, so that controlling the rotation number of the fan 17 can extend the total rotation time, that is, the integrated current supplying duration.

So, the life warning circuit 33$f$ obtains data of the deterioration rate of the components from the current supplying duration counting circuit 32$p$ so as to output a command for controlling the rotation number of the fan 17 to the main control circuit 35. The main control circuit 35 receives the rotation control command for the fan 17 outputted from the life warning circuit 33$f$ so as to output the fan rotation control command to the rotation control detection circuit 23, which controls the deterioration rate of the fan 17 to be close to the deterioration rate of the components.

When the integrated duration to the intersection point between the electronic components life warning line Tp and the fan life warning line Tf set for indicating the guideline of the efficient operating condition until the end-of-life, and of the preceding electronic component integrated life warning value βk and the preceding fan integrated life value αk become tmp_alm1 for the components (12$a$, 12$b$, 12$c$) and tnf_alm1 for the fan 17, the current supplying duration counting circuit 32$p$ and the rotation time counting circuit 32$f$ outputs a preceding warning signal to the main control circuit 35. Further, the integrated duration to the intersecting point of the electronic component life warning line Tp and the fan life warning line Tf, and, the electronic component integrated life warning value β and the fan integrated life value α is tmp_alm2 for the component (12$a$, 12$b$, 12$c$) and tnf_alm2 for the fan 17, the current supplying duration counting circuit 32$p$ and the rotation time counting circuit 32$f$ outputs a warning signal to the main control circuit 35.

When receiving a preceding warning signal from the current supplying duration counting circuit 32$p$ and the rotation time counting circuit 32$f$, the main control circuit 35 sends the preceding warning signal. The warning indication notification circuit 36 indicates the guideline showing the efficient operating condition of a component (including the fan 17) until the end-of-life. Accordingly, the user acknowledges the efficient operating condition of the component (including the fan 17) until the end-of-life based on the preceding warning from the warning indication notification circuit 36, namely, acknowledges that replacement timing for the component (including the fan 17) is coming. In this case, the warning indication notification circuit 36 indicates the preceding warning with respect to each life-span of component (including the fan 17), in other words, the warning indication notification circuit 36 indicates the preceding warning with respect to the long-life components (12$a$, 12$b$, 12$c$) and the short-life fan 17 separately.

The user can grasp the replacement timing for the component (including the fan 17) by each life-span by monitoring the indication of the preceding warning shown by each life-span of components (including the fan 17).

When receiving a warning signal from the current supplying duration counting circuit 32$p$ and the rotation time counting circuit 32f, the main control circuit 35 send the warning signal to the warning indication notification circuit 36, at the same time, informs a host computer 40 that a component (including the fan 17) reaches its end-of-life, that is, the power supply 10 will shut down. The warning indication notification circuit 36 indicates that the component (including the fan 17) reaches its end-of-life by each life-span of components (including the fan 17), and informs a host computer 40 that a component (including the fan 17) reaches its end-of-life, that is, the power supply 10 will shut down.

Because the user can acknowledge a target component for replacement by each component (including the fan 17) monitoring the warning indication shown by each life-span of component, the power supply 10 can be repaired with minimum time.

According to the principle of Arrhenius model, which says a life of a component shortens by half when temperature of the component having current supplying increases by 10° C., the current supplying duration function (y) shown the life warning line of the component has coefficient $\lambda_c$ which is inverse proportion to the life current supplying duration $Tp_i$. The coefficient $\lambda_c$ is shown in the equation (9):

$$\lambda_c = \frac{Tp_i}{L} \quad (9)$$

The Arrhenius model is shown in the equation (10):

$$L_n = L \times B^{\frac{T-T_n}{10}} \quad (10)$$

In the equation (10), $L_n$ shows a lifetime in an applied DC voltage at ambient temperature Tn° C., L shows a rated lifetime in a rated voltage at a recommended operating temperature T° C., and B shows a temperature acceleration coefficient (≈2).

Accordingly, the life warning circuit 33f, 33p perform life prediction according to the equations (9) and (10) modifying a life depending on the temperature.

Next, an operation of a life prediction and monitoring apparatus according to the embodiment will be explained with reference to FIG. 1 and FIG. 3.

In FIG. 3, the power supply 10 is activated (Step S1), and current is supplied to the fan 17 and the components (Step S2). The voltage detection circuit 21a, 21b, 21c detects supplied current at the components (Step S3), while the temperature detection circuit 22a, 22b, 22c detects temperature of the components (Step S4).

The current supplying duration counting circuit 32p receives an output signal (voltage) from the voltage detection circuit 21a, 21b, 21c and an output signal (temperature) from the temperature detection circuit 22a, 22b, 22c, and counts an integrated current supplying duration of the components (Step S5). The case in which the current supplying duration counting circuit 32p counts the integrated current supplying duration of the components will be specifically explained.

Firstly, the current supplying duration counting circuit 32p determines if the detected temperature outputted from the temperature detection circuit 22a, 22b and 22c exceed the recommended operating temperature for the components (Step S6). When the temperature is at the recommended operating temperature or less (NO from Step S6), the integrated current supplying duration for the components is counted without considering a correction coefficient depending on types or characteristics of the coil 12a and the capacitors 12b, 12c inputted from the parameter setting circuit 31p, skipping the processing of Step S7. In this case, the current supplying duration counting circuit 32p calculates the deterioration rate of the components (Step S8).

When the detected temperature outputted from the temperature detection circuit 22a, 22b, 22c exceed the recommended operating temperature of the components (YES from Step S6), the coefficient $\lambda_c$ shown in the equation (9) affects the integrated current supplying duration. So, the current supplying duration counting circuit 32p receives the correction coefficient depending on types and characteristics of the coil 12a and the capacitors 12b, 12c inputted from the parameter setting circuit 31p (Step S9), and adds the correction coefficient (Step S7), whereby the integrated current supplying duration for the components is counted. In this case, the current supplying counting circuit 32p calculates the deterioration rate of the components (Step S8).

The rotation time counting circuit 32f determines if the detected temperature outputted from the temperature detection circuit 22a, 22b, 22c exceed the recommended operation temperature for the fan (Step S10). When the temperature is at the recommended operating temperature or less, (NO from Step S10), the rotation time counting circuit 32f receives the data about the rotation number of the fan 17 in the stationary condition detected by the rotation control detection circuit 23 without considering a correction coefficient depending on the characteristics of the fan 17 inputted from the parameter setting circuit 31f (Step S11), and counts the integrated current supplying duration for the fan 17 (Step S12). In this case, the rotation time counting circuit 32f calculates the deterioration rate of the fan 17 (Step S12).

When the detected temperature outputted from the temperature detection circuit 22a, 22b, 22c exceeds the recommended operating temperature for the component as the temperature rise (YES from Step S10), the coefficient $\lambda_c$ shown in the equation (9) affects the integrated current supplying duration. So, the rotation time counting circuit 32f receives a correction coefficient depending on type and characteristic of the fan 17 inputted from the parameter setting circuit 31f (Step S13), and adds the correction coefficient (Step S14), so as to count the integrated current supplying duration for the fan 17 (Step S12). In this case, the rotation time counting circuit 32f calculates the deterioration rate of the fan 17 (Step S12).

The life warning circuit 33p receives data about the integrated current supplying duration and the deterioration rate of the components outputted from the current supplying duration counting circuit 32p and a current time date from the time circuit 34, and performs life prediction of the components (remaining current supplying duration calculation) (Step S15). The life warning circuit 33p determines if the integrated current supplying duration with respect to the life warning line Tp reaches the electronic component integrated life warning value β (Step S15), and outputs the main control circuit 35.

When the life warning circuit 33p confirms that the integrated current supplying duration with respect to the life warning line Tp reaches the electronic component integrated life warning value β, the life warning circuit 33p performs warning notification to the main control circuit 35 and the warning indication notification circuit 36 through the main control circuit 35 (Step S16). In this case, the warning indication notification circuit 36 and the main control circuit 35 perform warning notification to the host computer 40 (Step S16).

The life warning circuit 33f receives the data of the integrated current supplying duration and the deterioration rate of the fan 17 outputted from the rotation time counting circuit 32f and the current time data from the time circuit 34, and performs life prediction (remaining current supplying duration calculating) of the fan 17 (Step S17). The life warning circuit 33f determines if the integrated current supplying duration with respect to the life warning line Tf reaches the fan integrated life warning value α, and outputs to the main control circuit 35.

When determining that the integrated current supplying duration with respect to the life warning line Tf reaches the fan integrated life warning value α, the life warning circuit 33f performs warning notification to the main control circuit 35 and the warning indication notification circuit 36 through the main control circuit 35 (Step S17). In this case, the warning indication notification circuit 36 and the main control circuit 35 perform warning notification to the host computer 40.

Moreover, the main control circuit 35 receives the data of the deterioration rate of the components from the current supplying duration counting circuit 32p, and compares the deterioration rate of the fan with the deterioration rate of the components. When the difference between the rates exceeds the threshold (YES from Step S17), the command to increase the rotation number of the fan 17 is outputted to the rotation control detection circuit 23 (YES from Step S17).

After determining if the integrated current supplying duration with respect to the life warning line Tf outputted from the life warning circuit 33f reaches the fan integrated life warning value α, the main control circuit 35 compares the deterioration rate of the component received from the current supplying duration counting circuit 32p with the deterioration rate of the fan through the life warning circuit 33p. When the difference between the rates does not exceed the threshold (NO from the Step S17), the main control circuit 35 outputs the efficient operating condition of the fan 17 to the warning indication notification circuit 36.

On the other hand, when the integrated current supplying duration with respect to the life warning line Tp reaches the electronic component integrated life warning value β, the life prediction and monitoring apparatus 20 compares the deterioration rate of the components received from the current supplying duration counting circuit 32p with the deterioration rate of the fan through the life warning circuit 33p, notifies warning through the main control circuit 35 and the warning indication notification circuit 36 (Step S17). In this case, the warning indication notification circuit 36 and the main control circuit 35 performs warning notification to the host computer 40 (Step S16).

According to the embodiment, the current supplying duration is counted, life prediction for the device is performed based on the counted current supplying duration and the lifetime, and the efficient operating condition of the device is monitored at each life-span of the fan and the component based on the life prediction signal, whereby accuracy of the life prediction can be increased and failure prediction for the device can be performed stably. Therefore, reliability of measures to perform preventative replacement for a component can be increased by detecting a failure occurrence of the power supply in advance.

According to the embodiment, the counting unit at the fan corrects the integrated current supplying duration and the lifetime by adding the correction coefficient associated with increase of the rotation number of the fan due to temperature of the long-life components exceeding the threshold, and the counting unit at the long-life components corrects the integrated current supplying duration and the lifetime by adding the correction coefficient associated with temperature on measuring the current supplying duration exceeding the threshold. Therefore, life prediction and prediction of the optimal current supplying duration can be performed.

According to the embodiment, the counting unit at the fan differentiates an equation indicating the life warning line of the fan shown as the current supplying duration function so as to calculate the deterioration rate of the fan, the counting unit in the long-life components differentiates an equation indicating the life warning line of the components shown as the current supplying duration function so as to calculate the deterioration rate of the long-life components, and the monitoring unit inputs information on the calculated deterioration rates of the fan and the long-life components and reduces the rotation number of the fan so as to control the deterioration rate of the fan to be close to the deterioration rate of the long-life components. Thereby the efficient operating condition of the fan can be extended.

FIG. 4 is a block diagram showing an embodiment of a storage device according to the present invention. The followings is an explanation with reference to this drawing.

A storage device 50 according to the present embodiment comprises the power supply 10, the life prediction and monitoring device 20, a recording medium 51 with information recorded, and an information reading/writing unit 52 which performs at least reading or writing information from/to the recording medium 51 upon receipt of power supplied by the power supply 10. The power supply 10 and the life prediction and monitoring apparatus 20 are configured as in FIG. 1, and the details thereof are described above. The recording medium 51 is such as a commonly used magnetic disc, and the information reading/writing unit 52 is such as a commonly used disc array system except for a magnetic disc part. These are well known so that specific explanations therefor are omitted. The storage device 50 according to the present embodiment has the life prediction monitoring apparatus 20 described above, which extends a life of the power supply 10, and thereby the reliability is increased.

INDUSTRIAL APPLICABILITY

Devices specifically required reliability can increase these reliability by adopting the present invention.

What is claimed is:

1. A life prediction and monitoring apparatus which predicts a life of a component to determine a device life so as to monitor an efficient operating condition of the device, the apparatus comprising:
    a counting unit for counting and integrating a current supplying duration for the component;
    a life prediction unit for predicting the life of the component based on the integrated current supplying duration integrated by the counting unit and a lifetime of the component; and
    a monitoring unit for monitoring the efficient operating condition of the device based on a prediction signal outputted from the life prediction unit
    wherein
    the counting unit and the life prediction unit is provided at a short-life fan and a long-life component having no movable parts, respectively.

2. The life prediction and monitoring apparatus, as claimed in claim 1, wherein
    the counting unit provided at the fan corrects the integrated current supplying duration and the lifetime by adding a correction coefficient associated with increase of a fan rotation number due to temperature of the long-life component exceeding a threshold; and
    the counting unit provided in the long-life component corrects the integrated current supplying duration and the lifetime by adding a correction coefficient associated with temperature on measuring the current supplying duration exceeding the threshold.

3. The life prediction and monitoring apparatus, as claimed in claim 1, wherein the counting unit provided at the fan calculates a deterioration rate of the fan by differentiating an equation indicating a life warning line of the fan shown as a current supplying duration function, the counting unit provided at the long-life component calculates a deterioration rate of the long-life component by differentiating an equation indicating a life warning line of the component shown as a current supplying duration function, and the monitoring unit inputs information on the calculated deterioration rates of the fan and the long-life component and controls the deterioration rate of the fan to be close to the deterioration rate of the long-life component by reducing a fan rotation number.

4. A life prediction and monitoring method for predicting a life of a component to determine a device life so as to monitor an efficient operating condition of the device, the method comprising:

a counting step of counting and integrating a current supplying duration for the component; and a life prediction step of predicting the life of the component based on the integrated current supplying duration and a lifetime of the component; wherein the counting step and the life prediction step are performed with respect to a short-life fan and a long-life component having no movable parts, and an efficient operating condition of the device is monitored based on a prediction signal predicted in the life prediction step.

5. The life prediction and monitoring method, as claimed in claim 4, wherein the integrated current supplying duration and the lifetime of the fan are corrected by adding a correction coefficient associated with increase of a rotation number of the fan due to temperature of the long-life component exceeding a threshold;

the integrated current supplying duration and the lifetime of the long-life component are corrected by adding a correction coefficient associated with increase of the temperature on measuring the current supplying duration exceeding the threshold.

6. The life prediction and monitoring method, as claimed in claim 4, wherein a deterioration rate of the fan is calculated by differentiating an equation which indicates a life warning line of the component shown as a current supplying duration function, a deterioration rate of the long-life component is calculated by differentiating an equation which indicates a life warning line of the component shown as a current supplying duration function, and the deterioration rate of the fan is controlled to be close to the deterioration rate of the long-life component by reducing a fan rotation number.

7. A life prediction and monitoring program encoded in a computer-readable medium causing a computer which configures a life prediction and monitoring apparatus predicting a life of a component to determine a device life so as to monitor an efficient operating condition of the device to execute the functions of:

counting and integrating a current supplying duration for the component with respect to a short-life fan and a long-life component;

predicting the life of the component based on an integrated current supplying duration and a lifetime of the component with respect to a short-life fan and a long-life component having no movable parts; and monitoring an efficient operating condition of the device based on a prediction signal predicted in the life prediction step.

8. The life prediction and monitoring program, as claimed in claim 7, wherein the program causes the computer to execute the functions of correcting the integrated current supplying duration and the lifetime of the fan by adding a correction coefficient associated with increase of a fan rotation number due to temperature of the long-life component exceeding a threshold; and correcting the integrated current duration and the lifetime of the long-life component by adding a corrective coefficient associated with the temperature on measuring the current supplying duration exceeding the threshold.

9. The life prediction and monitoring program, as claimed in claim 7, wherein the program causes the computer to execute the functions of;

calculating a deterioration rate of the fan by differentiating an equation which indicates a life warning line of the component shown as a current supplying duration function;

calculating a deterioration rate of the long-life component by differentiating an equation which indicates a life warning line of the component shown as a current supplying duration function; and controlling the deterioration rate of the fan to be close to the deterioration rate of the long-life component by reducing a fan rotation number.

* * * * *